2 Sheets—Sheet 1
J. DILLON.
Fire-Extinguisher.
No. 7,930. Reissued Oct. 30, 1877.
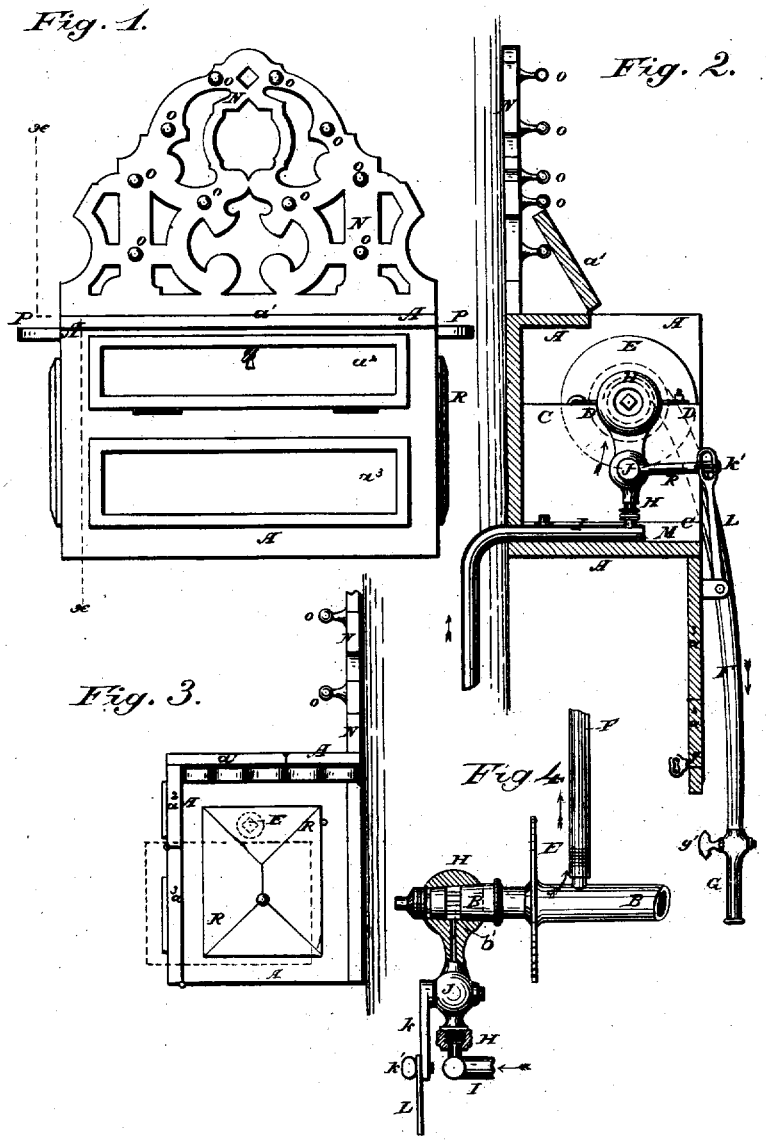
Attest:
R. T. Dyer
L. N. Seely
Inventor
John Dillon
by Geo. W. Dyer & Co
Attys
N. PETERS, PHOTO-LITHOGRAPHER, WASHINGTON, D. C.

2 Sheets—Sheet 2.

J. DILLON.
Fire-Extinguisher.

No. 7,930. Reissued Oct. 30, 1877.

*Attest:*
R. A. Dyer
L. W. Sully

*Inventor:*
John Dillon,
by Geo. W. Dyer & Co.
attys.

N. PETERS, PHOTO-LITHOGRAPHER, WASHINGTON, D. C.

UNITED STATES PATENT OFFICE.

JOHN DILLON, OF NEW YORK, N. Y.

IMPROVEMENT IN FIRE-EXTINGUISHERS.

Specification forming part of Letters Patent No. 146,386, dated January 13, 1874; Reissue No. 7,930, dated October 30, 1877; application filed September 20, 1877.

*To all whom it may concern:*

Be it known that I, JOHN DILLON, of the city, county, and State of New York, have invented a new and useful Improvement in Fire-Extinguishers, &c., of which the following is a specification:

The object of my invention is a fire-extinguisher capable of being placed conveniently within any building where it may be easily accessible, and permanently connected with the water-supply, so that at the instant of an alarm of fire any person resorting to the apparatus will, through the means provided, cause the hose to be filled with water under pressure, so that in an instant the stream of water issues from the pipe with full force; and the novelty of my invention consists in the employment of a hollow reel-shaft, in which the water-supply is introduced; in mounting a hose-reel upon such hollow shaft; in connecting the water-supply to such hollow shaft; in connecting the hose with such hollow shaft; in providing suitable means for cutting off and letting on the supply of water; and, generally, in the novel combinations of the various operative parts, all as more fully hereinafter described.

In order that those skilled in the art may know how to make and use my apparatus, I proceed to describe the same, having reference to the drawings, making a part of this specification, in which—

Figure 5:
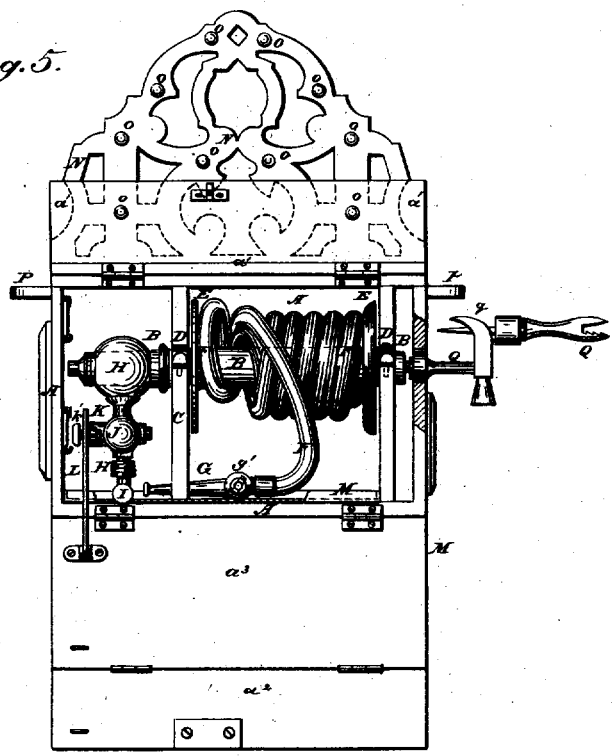
Figure 6:
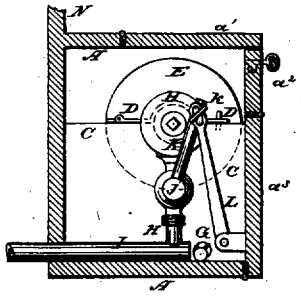

Figure 1 is a front view of my improved device, the case being shown closed. Fig. 2 is a vertical section of the same through the line *xx*, Fig. 1, the case being shown open; Fig. 3, an end view of the same; Fig. 4, a detail view, partly in section, showing the manner in which the water passes from the water-pipe through the revolving reel-shaft to the hose; Fig. 5, a front view of the device, the case being shown open. Fig. 6 is the same section as Fig. 2, but showing the case closed.

Like letters denote corresponding parts.

A is the box or case, which is designed to be secured to the wall of the hall or other room of the house, at a convenient distance above the floor. The bottom, back, ends, and rear part of the top or cover of the case A are rigidly connected with each other. The forward part $a^1$ of the top or cover of the case A is hinged at its rear edge to the forward edge of the rear or stationary part of said top or cover. The front of the case A is made in two parts, $a^2$ $a^3$, the lower edge of the upper part $a^2$ being hinged to the upper edge of the lower part $a^3$. The lower edge of the lower part $a^3$ is hinged to the forward edge of the bottom of the case A.

By this construction access may be obtained to the interior of the case A by turning back the cover $a^1$, and turning down the upper part $a^2$ of the front, or both the upper and lower parts of said front may be turned down.

B is the reel-shaft, the journals of which revolve in half-bearings in the upper edges of the partitions or brackets C, secured in the interior of the case A. The shaft B is made with shoulders or collars at each end of each of its journals, to prevent it from having a longitudinal movement. The shaft B is secured in its bearings by straps D, hinged at one end to the brackets C, and secured at their other ends by buttons, eccentric knobs, or other convenient fastenings. To the shafts B, between the brackets C, are secured the flanges or disks E that form the ends of the reel. One of the disks E is made with a vertical and the other with an inclined inner side, as shown in Fig. 5. One end of the shaft E is tubular, and with its cavity is connected, close to the vertical flange or disk E, the end of the wire-lined rubber hose F, to the other or free end of which is secured a nozzle, G, which is provided with a stop-cock, $g'$, to enable the escape of the water to be stopped when desired. The wire of the hose enables the water to pass through it freely, even when wound upon the reel.

When the hose is wound upon the reel B E the nozzle G is inserted in a hole in the partition or bracket, as shown in Figs. 5 and 6.

The tubular end of the shaft B projects beyond the bracket C, and is made conical, to fit into the tapering hole in the globular end of the short ingress-pipe, H, the other end of which is connected with the water-pipe I of the house.

The short pipe H is provided with a stop-cock, J, the plug of which is made with a crank-handle, K, to the end of which is pivoted a button, $k'$, which may be passed through a slot in the end of a bar, L, and turned across said slot, pivoting the bar L detachably to said crank-handle K. The other end of the bar L is pivoted to the lower part $a^3$ of the front of the case A, so that the stop-cock J may be opened and closed by lowering and raising the said lower part $a^3$ of the front of the case A.

By detaching the bar L from the crank-handle K of the stop-cock J, the front $a^2$ $a^3$ of the case A may be lowered and raised without disturbing the stop-cock J. This allows the stop-cock J to be closed, while the front $a$ $a^2$ is lowered to shut off the water when about to wind the hose F upon the reel B E.

The operation of winding the hose F upon the reel B E causes the water to run from the said hose F, so that it may be free from water when wound up.

It will be observed that the reel-shaft B revolves, while the pipe H stands still. To enable this to be done without interrupting the flow of water, a ring-groove, $b'$, is formed around the tapering part of the end of the shaft B, as shown in Fig. 4, so that the water may pass constantly from the pipe I to the interior of the shaft B, and thence to the hose F, even when the said shaft is revolving.

The water that escapes from the hose F while it is being wound upon the reel B E is received in the drip-pan M, which is fitted into the bottom of the case A, and is designed to be provided with a pipe, (not shown in the drawing,) connecting it with the waste-pipe or sewer.

To the rear upper part of the case A is attached a frame-work, N, provided with pins O, to adapt it to serve as a hat-racks. To the upper part of the ends of the case A are attached flanges or frames P, provided with openings to adapt them to serve as umbrella-racks. The closed end of the shaft B is squared off to receive a key or the crank Q for turning it to wind up the hose F, which key or crank is inserted through a hole in the end of the case A.

The crank Q is of peculiar construction, and is not here described, as it is intended to be the subject of a separate patent.

The key-hole in the end of the case is covered by a pivoted or sliding panel, R, which can be readily moved aside when it is desired to use said key or crank.

The hose F is designed to be made so long that its free or nozzle end may be taken to any part of the house where a fire may occur, or be taken out of doors to wash the sidewalk, steps, windows, or front of the house.

In case the pressure in the water-pipe may not be sufficient to force the water through the hose F when its free end is taken to the upper part of the house, a force-pump may be connected with the pipe I below the pipe H, to give the necessary pressure.

Having thus described my invention, I claim as new and desire to secure by Letters Patent—

1. A fire-extinguisher consisting of a hose-reel and a suitable hose thereon, adapted to be permanently connected while on the reel with the water-pipe of a building having water under pressure, substantially as described.

2. In a fire-extinguisher adapted to be permanently connected with a water-pipe of a building having water under pressure, a hose-reel having means for the connection of the hose with the reel, and for the connection of the reel with the water-supply pipe, substantially as described.

3. In a fire-extinguisher adapted to be permanently connected with a water-pipe of a building having water under pressure and provided with suitable hose, means for opening a connection with the water-pipe, so that the hose before being unwound will be filled with water under pressure, substantially as described.

4. In a fire-extinguisher adapted to be permanently connected with the water-pipe of a building having water under pressure, the combination of a hose-reel, a hollow shaft, and suitable hose, said parts being constructed and arranged so that the hose may be filled with water while upon the reel, substantially as described.

JOHN DILLON.

Witnesses:
SANFORD H. STEELE,
J. H. BEARDSLEY.